Oct. 18, 1927.

J. B. HAWKINS 1,646,245

DRINKING FOUNTAIN FOR LIVE STOCK

Filed Sept. 15, 1926      2 Sheets-Sheet 2

Inventor

J. B. Hawkins.

By Lacey & Lacey, Attorneys

Patented Oct. 18, 1927.

1,646,245

UNITED STATES PATENT OFFICE.

JAMES B. HAWKINS, OF SLATER, MISSOURI.

DRINKING FOUNTAIN FOR LIVESTOCK.

Application filed September 15, 1926. Serial No. 135,616.

This invention is a watering fountain for live stock and is intended more particularly for providing a constant supply of water for hogs although it is adapted for use by larger stock and also may be slightly modified to be available for poultry and smaller stock. One object of the invention is to provide a fountain which will operate automatically to maintain a supply of water in the fountain and to which the water may be fed from a distant source. Another object of the invention is to provide a stock-watering fountain of simple and inexpensive but durable construction which may be very easily cleaned when necessary, and a further object of the invention is to provide a fountain in which the water may be heated when necessary and also to provide means whereby several fountains may be automatically controlled from a single source. The invention is illustrated in the accompanying drawings and will be hereinafter fully set forth.

Figure 1:
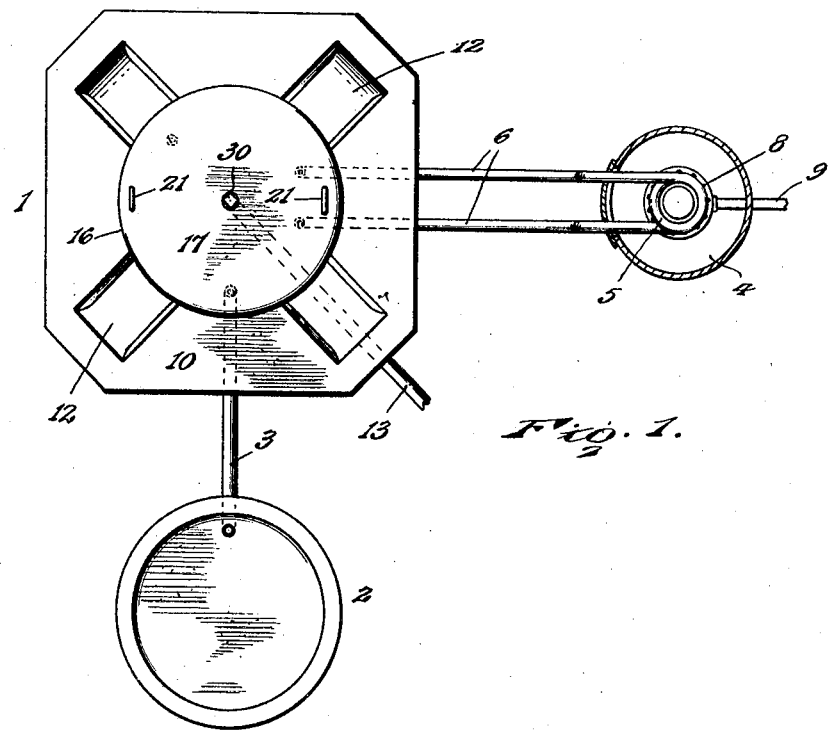
Figure 1 is a plan view of an apparatus embodying the invention.

As shown in Fig. 1, the stock-watering apparatus embodies a master fountain 1, a remote fountain 2 which is connected with the main water receptacle or receiving chamber of the master fountain through a water pipe 3, and also includes a heater 4 of any approved construction having a water coil 5 therein which is connected by terminal pipes 6 with the main water space or receiving chamber of the master fountain. Any number of auxiliary or remote fountains 2 may be employed and the level of the water therein will always be the same as the level of the water in the master fountain inasmuch as the pipe 3 communicates with the master and the auxiliary fountains through the bottoms of the same. The heater 4 is, of course, provided for use in cold weather to prevent the water freezing and maintaining it at such a temperature as will be palatable so that there will be a constant supply of water available for the live stock at all times. While the heater 4 may be of any preferred form, I have illustrated a cylindrical casing housing the coil 5 and containing a burner 8 for liquid or gaseous fuels which may be supplied through a pipe 9 from any convenient source.

Figure 2:
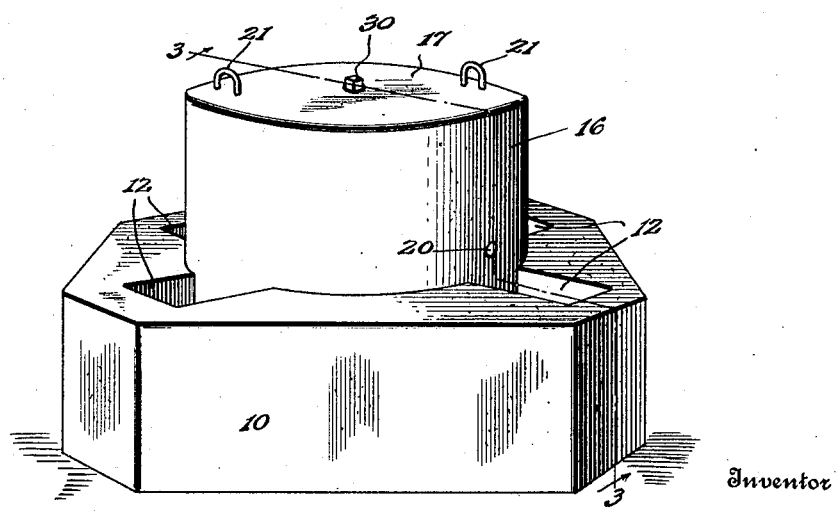
Fig. 2 is an enlarged perspective view of the master fountain.

The main or master fountain comprises a base member or bowl 10 which will generally be constructed of reinforced concrete, and it may be noted that the auxiliary fountains 2 will likewise be constructed of reinforced concrete and will differ from the main fountain in being merely an open trough of any desired form. The base or bowl 10 is preferably provided with a preferably cruciform water chamber having a central circular chamber 11 and a plurality of cups 12 extending radially therefrom. At the center of the chamber 11 is located a supply pipe 13 which leads underground to the bowl from any accessible source of supply, and in the upper end of this supply pipe 13 is secured a collar 14 which is properly shaped to constitute a seat for an automatic cut-off valve. The floor or bottom of each cup 12 is curved at its outer portion, as shown at 15, thereby facilitating manufacture and avoiding the presence of deep corners in which sediment may collect. The outer portion of the bowl may have any preferred shape provided it permits the drinking animals to approach closely to the cups 12, the drawings showing a base or bowl of an irregular octagonal form. Seating in the bowl is a cover 16 of reinforced concrete which is open at its lower end and has a closed top, as shown at 17, the cover being preferably cylindrical in form and of such diameter that it will fit closely but not tight within the central circular portion of the water chamber 11. In the lower edge of the cover are notches 18 which are properly spaced to aline with the respective cups 12 so that water delivered into the central chamber 11 may flow at once into the several cups and attain the same level therein as it has in the main receiving chamber. In order to maintain the supply of water in the cups in the contingency that mud or other matter may accumulate in the chamber 11 so as to choke the notches or openings 18, additional openings 19 may be provided through the wall of the cover at points above the lower edge thereof, and these openings are normally closed, the closures, however, being easily removable when the emergency requiring the use of the openings 19 arises. Above the top of the bowl, a vent opening 20 is formed through the side wall of the cover so that the trapping of air above the float will be prevented and the air pressure in the upper portion of the cover will always be that of the atmosphere. As stated, the cover fits closely but not tight within the central chamber of the bowl and is removable when cleaning of the apparatus or repairs to the same may be necessary, and to facilitate the removal of the cover eyes or loops 21 are embedded in the top thereof, as shown in Figs. 1 and 2.

Figure 3:
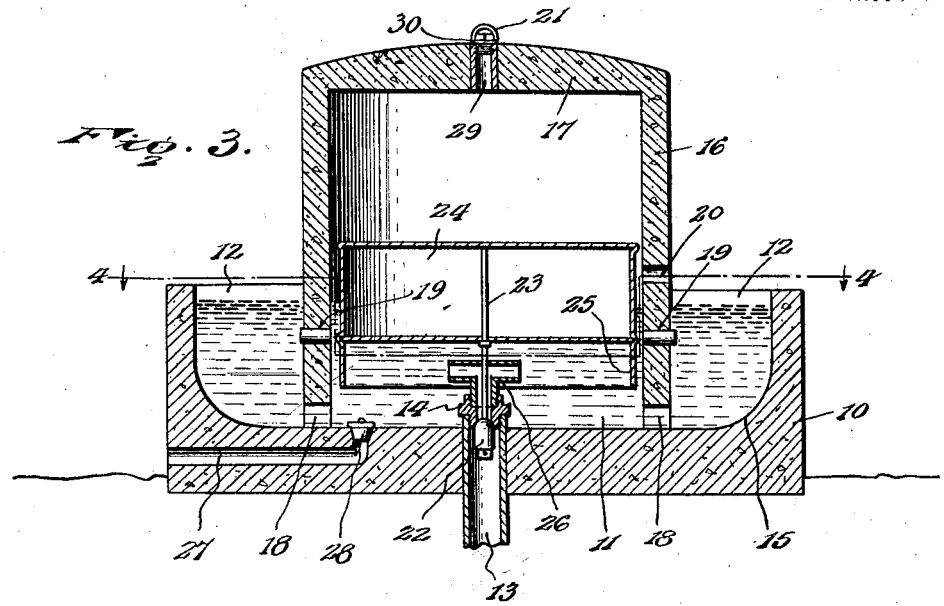
Fig. 3 is a vertical section on the line 3—3 of Fig. 2.
Figure 4:
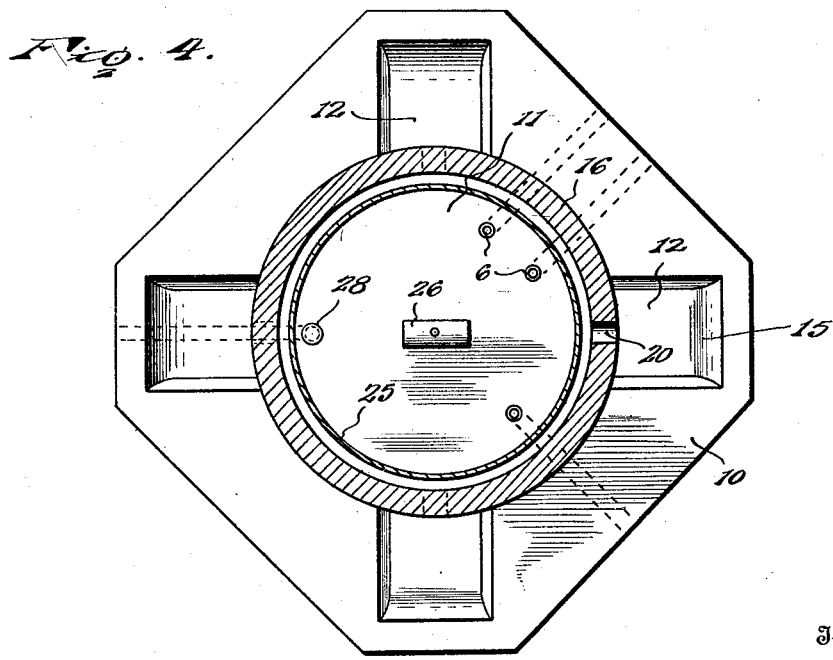
Fig. 4 is a horizontal section on the line 4—4 of Fig. 3.

Arranged within the end of the water supply pipe 13 in position to move upwardly into engagement with the seat furnished by the collar 14 is a cut-off valve 22 preferably of the rubber ball type. The stem 23 of this valve passes upwardly through the collar 14 to a point above the same and to the upper portion of the stem is secured a float 24 of any approved form and dimensions but preferably circular so that it will move readily within the cover 16. Upon reference to Fig. 3, it will be noted that the stem 23 passes entirely through the float at the center thereof and both top and bottom plates of the float are secured to the stem whereby the float will be maintained in a right angular relation to the stem. The float obviously will rise and fall within the cover 16 as the level of the water in the main water chamber 11 varies, and in order that the float may operate efficiently to unseat the valve where the water supply has a considerable head, I provide a depending rim 25 on the bottom of the float which fits closely to the side of the cover and thereby tends to minimize and eliminate the agitation and splashing of the water as it is delivered and also tends to create a vacuum at the bottom of the float as the water is consumed by the live stock, thereby creating a suction which aids in causing downward movement of the float to effect unseating of the valve against the pressure of the water flowing thereto. In the upper side of the collar 14 is fitted a T-coupling 26 which has its stem member concentric with the valve stem and has its delivery ports directed radially from the stem so that the inflowing water will be diverted and discharged laterally instead of upwardly against the float. It will be understood that as the level of the water in the bowl rises, the float will be raised and the valve 22 will be thereby brought into engagement with its seat in the collar 14 and the flow of water cut-off. As the water is used, the level will, of course, drop and eventually will reach such a point that the float will be caused to descend and thereby unseat the valve to permit a replenishment of the water supply.

A drain passage 27 is provided in the bottom of the bowl and the inner end of this passage is normally closed by a plug 28 in an obvious manner, while in the top of the cover 16 at the center thereof is an opening 29 through which a rod or similar implement may be inserted to press upon the float and cause the same to move downwardly and unseat the valve in the event that the valve and float should fail to operate properly from any cause. The opening 29 is normally closed by a plug 30.

It will be seen from the foregoing description, taken in connection with the accompanying drawings, that I have provided an exceedingly simple, inexpensive and durable fountain, by the use of which a constant supply of water for live stock will be automatically maintained. The cover merely rests upon the bottom of the bowl while being free thereof so that it may be freely removed when necessary. After it has been removed the plug 28 may be very easily withdrawn so as to permit the water in the bowl to drain out, preparatory to removing all accumulations of foreign matter from the bowl. The water supply pipe 13 may be provided with a cut-off valve of any well-known or approved construction so that the inflow of water to the bowl may be cut off while the bowl is being cleaned or the float may be supported in its raised position by interposing any convenient object therebeneath to maintain it elevated while the bowl is being cleaned. The form of the bowl particularly illustrated is well adapted for supplying water to hogs and other larger live stock inasmuch as it permits the drinking animals to easily reach the water while at the same time they are of necessity separated so that crowding at any one cup and consequent waste of the water will be avoided. The provision of auxiliary drinking troughs also serves to separate the drinking animals. When the fountain is intended to be used by poultry and other small stock, the form of the bowl may be varied by making the cups 12 smaller and providing them in greater numbers so that they may, in effect, be corrugations extending vertically through the entire circumferential extent of the central water chamber of the bowl. In such event, of course, the notches or openings 18 will be increased in number so that there will be one notch or opening for each cup in order that there will be access for the water to all the cups from the central receiving chamber.

Having thus described the invention, I claim:

1. An apparatus for the purpose set forth comprising a bowl having drinking cups formed in its upper surface and a central chamber in open communication with said cups, a cover fitting closely within the central chamber of the bowl and constructed to permit water to flow from the said chamber to the cups, a water supply pipe communicating with the central water chamber through the bottom of the bowl at a point within the cover, a valve in the delivery end of the pipe, a float within the cover connected to said valve, and a rim depending from the bottom of the float.

2. A drinking fountain comprising a bowl having a central water-receiving chamber and cups around the said chamber, a cover free of the bowl but seating in the central chamber thereof and constructed to establish water communication between said chamber and the several cups, means for delivering water to the central chamber, means housed by the cover for controlling the water-delivering means, and a normally closed drain extending through the bottom of the bowl from a point within the cover.

In testimony whereof I affix my signature.

JAMES B. HAWKINS. [L. S.]